(12) United States Patent
Balayn et al.

(10) Patent No.: US 6,260,793 B1
(45) Date of Patent: Jul. 17, 2001

(54) CONVERTIBLE AIRCRAFT WITH TILTING ROTORS

(75) Inventors: Frédéric Balayn; Eric Magre, both of Vitrolles (FR)

(73) Assignee: Eurocopter (FR)

( * ) Notice: Subject to any disclaimer, the term of this patent is extended or adjusted under 35 U.S.C. 154(b) by 0 days.

(21) Appl. No.: 09/411,558

(22) Filed: Oct. 1, 1999

(30) Foreign Application Priority Data

Mar. 30, 1999 (FR) .................................................. 99 03956

(51) Int. Cl.[7] .......................... B64C 27/22; B64C 27/52; B64C 1/38; B64D 27/00; B64D 29/00
(52) U.S. Cl. ............................... 244/7 R; 244/56; 244/66; 244/130
(58) Field of Search .................................. 244/7 R, 7 C, 244/56, 66, 130, 26, 51, 214, 215; 416/148

(56) References Cited

U.S. PATENT DOCUMENTS

| | | | | |
|---|---|---|---|---|
| 3,035,789 | * | 5/1962 | Young | 244/7 C |
| 3,089,666 | * | 5/1963 | Quenzler | 244/7 R |
| 4,962,902 | * | 10/1990 | Fortes | 244/75 R |
| 5,054,716 | * | 10/1991 | Wilson | 244/56 |
| 5,094,412 | * | 3/1992 | Narramore | 244/214 |
| 5,096,140 | * | 3/1992 | Dornier, Jr. et al. | 244/7 C |
| 5,388,788 | * | 2/1995 | Rudolph | 244/215 |
| 5,823,470 | * | 10/1998 | Craig et al. | 244/7 R |

OTHER PUBLICATIONS

XP–002106270 Fischer A, Unterhitzenberger J: <<Propulsion system concept for the Eurofar tilt rotor aircraft<< 16th European Rotor Forum—Glasgow (U.K.).

* cited by examiner

*Primary Examiner*—Charles T. Jordan
*Assistant Examiner*—Christian M. Best
(74) *Attorney, Agent, or Firm*—Piper Marbury Rudnick & Wolfe

(57) ABSTRACT

To provide aerodynamic continuity between the front part, pivoting with the rotor, and the stationary rear part of a pod housing an engine for driving the rotor, a curved cowl curved about the pivot axis extends the rear edge of the bottom cowling of the front part to join this rear edge to the front edge of a bottom cowling of the stationary rear part, in helicopter mode, and a flap swivel-mounted on the top cowling of the front part joins this latter to the top cowling of the stationary rear part, onto which this flap is folded, in helicopter mode.

45 Claims, 6 Drawing Sheets

Figure 3:
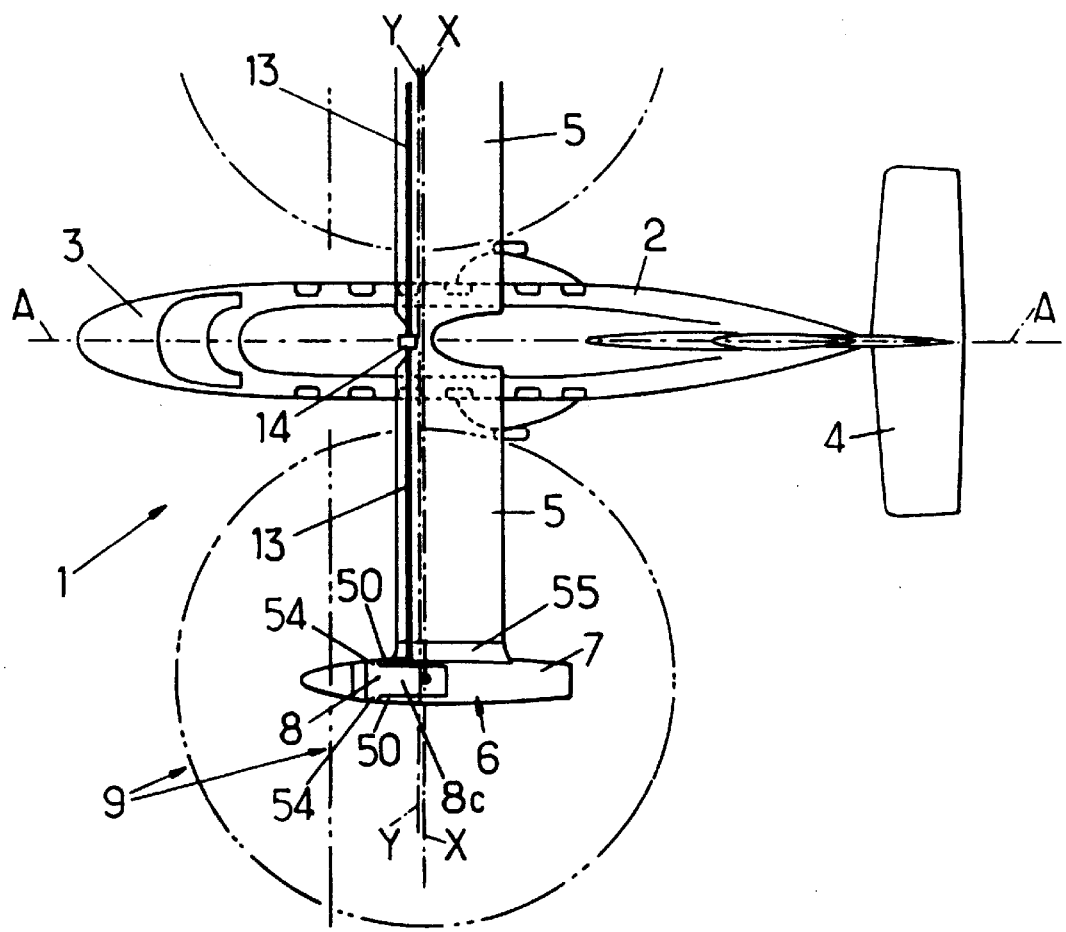

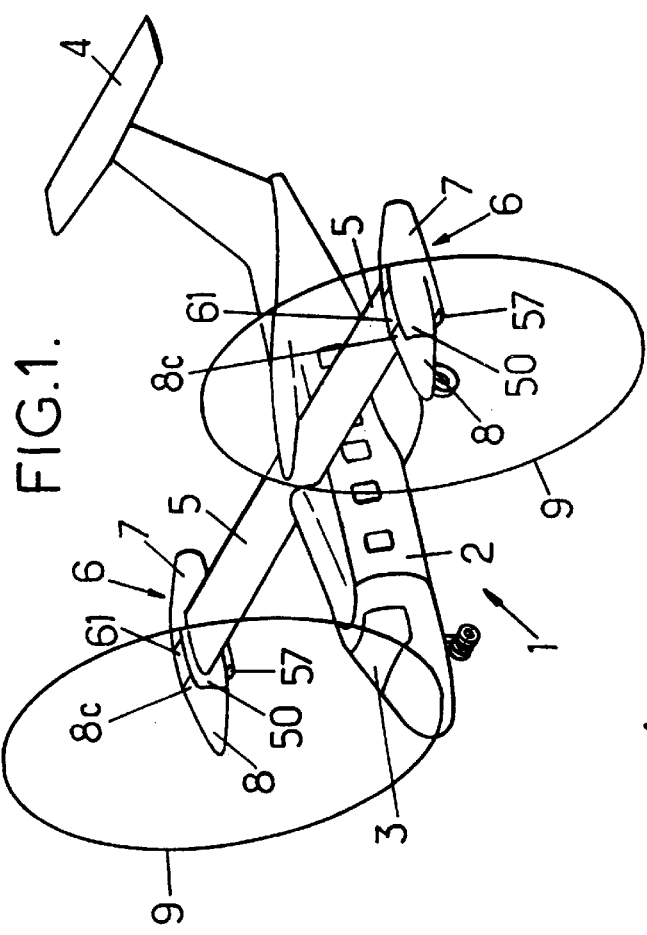
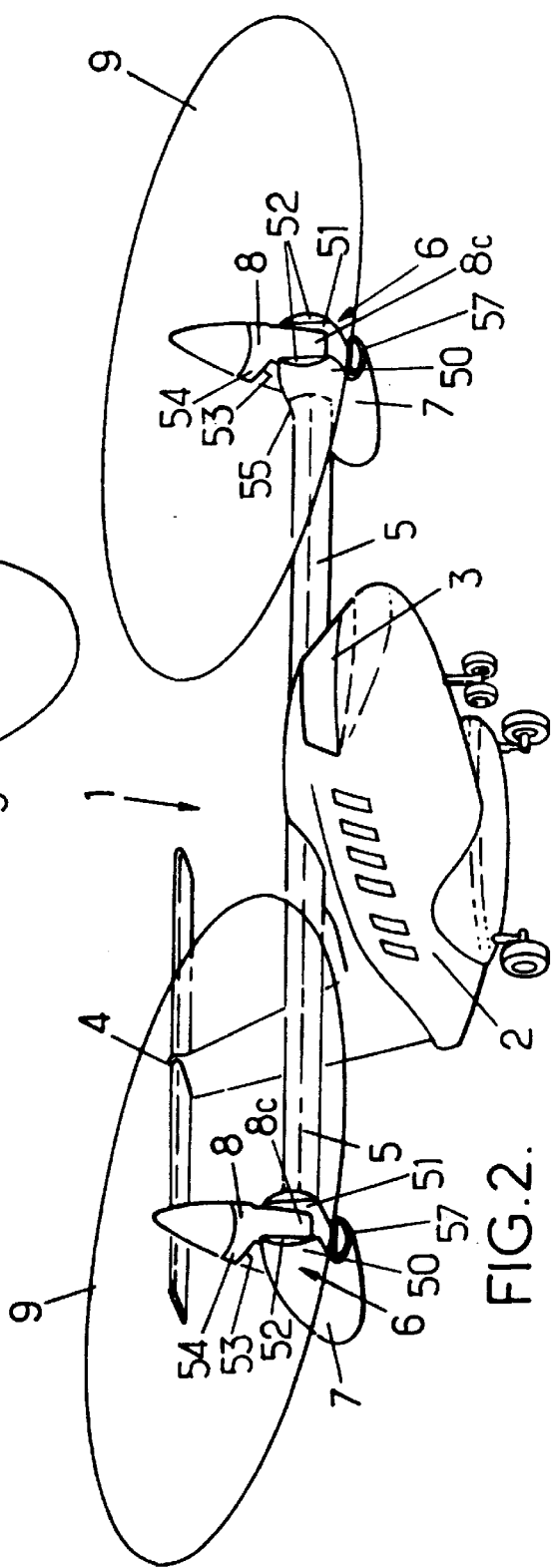
FIG.1.
FIG.2.

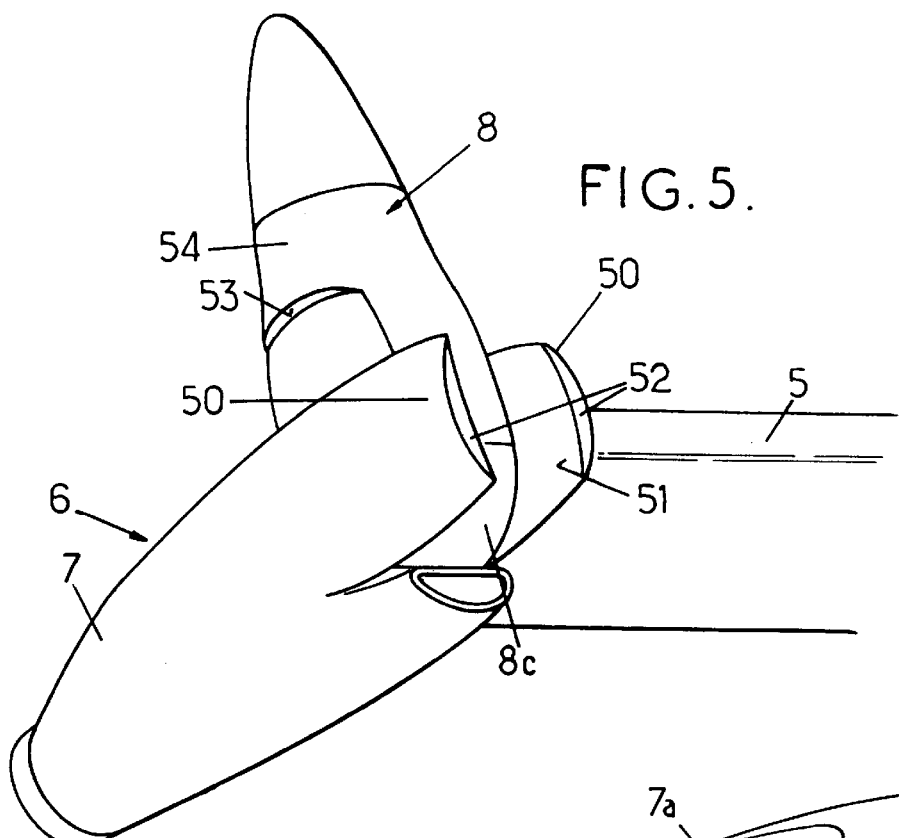
FIG.5.
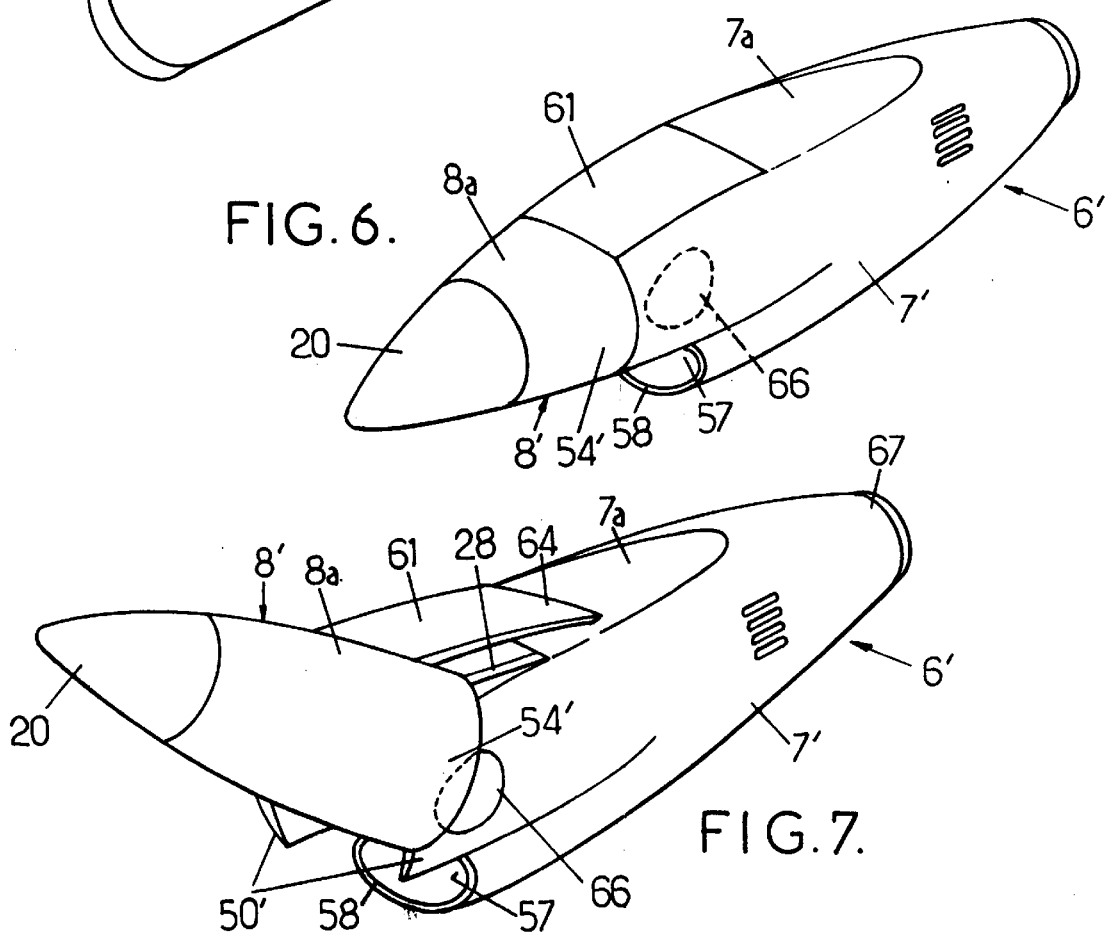
FIG.6.
FIG.7.

CONVERTIBLE AIRCRAFT WITH TILTING ROTORS

The invention relates to improvements, particularly with regard to the aerodynamics, made to a convertible aircraft with tilting rotors which is capable of operating in aeroplane mode and in helicopter mode, and comprising at least one fuselage, a fixed wing system comprising at least two wings extending laterally on either side of the fuselage and, in helicopter mode, a rotating wing system comprising at least two rotors, each having a substantially vertical shaft erected above a respective fixed wing and mounted so that the shaft can pivot on this fixed wing about a pivot axis arranged transversely to the fuselage, the shaft pivoting towards the front of this fixed wing in order to switch from helicopter mode to aeroplane mode, in which case the rotors act as propellers.

The invention more specifically relates to a convertible aircraft with tilting rotors of the type in which the shaft of each rotor is driven in rotation about itself by a front reduction gear unit of one respectively of two transmissions, each also having a rear reduction gear unit linked to the corresponding front reduction gear unit as well as to one respectively of two engines, each supported respectively on one of the two fixed wings, and to an inter-connecting shaft linking the two transmissions so that the two rotors can be driven in rotation by either of the two engines in the event that the other engine fails, the shaft of each rotor, the corresponding transmission and the corresponding engine being housed respectively in one of two articulated pods or nacelles, each comprising a front part which pivots about the pivot axis on a fixed rear part fixed respectively to one of the two fixed wings and in which the corresponding engine and at least a part of the rear reduction gear unit of the corresponding transmission are housed, the front reduction gear unit thereof and corresponding rotor shaft being housed in the pivoting front part of the pod and being mounted so as to pivot with said front part relative to said rear part and said corresponding wing.

In a convertible aircraft with tilting rotors of the type outlined above, it is extremely desirable, not to say indispensable, to provide the greatest aerodynamic continuity possible between the two parts, one articulated on the other, of each pod, regardless of the flight configuration (aeroplane mode or helicopter mode) and it is necessary to avoid having too many orifices or discontinuities between the cowlings of the pivoting front part and the stationary rear part of each pod when the corresponding rotor is in helicopter mode and more particularly in aeroplane mode when the aircraft reaches much higher speeds.

The basic problem underlying the invention is that of improving convertible aircraft With tilting rotors of the type described above so as to guarantee an aerodynamic continuity in the different flight configurations adopted by each articulated pod in order to reduce turbulence and other aerodynamic problems and to prevent foreign bodies from getting into orifices or discontinuities in and/or between the cowlings of the two articulated parts of each pod.

Accordingly, one objective of the invention is to improve convertible aircraft with tilting rotors of the type outlined above so that the discontinuities and/or orifices between the cowlings of the two articulated parts of each pod can be substantially closed off using a small number of moving components, thereby enabling the aerodynamic continuity to be substantially preserved and/or reestablished without adding to the mechanical complexity, which would necessarily lead to an increase in mass and cost, and in a manner more conducive to meeting various practical requirements than solutions proposed in the prior art.

To this end, the invention proposes that the pivoting front part of the pod should have a bottom fairing in aeroplane mode, which is extended towards the rear and towards the interior of the rear stationary part of the pod by means of a curved cowl, the concave aspect of which is turned towards the pivot axis and at least partially curved and axisymmetric (of revolution) about this pivot axis, so that when said pivoting front part of the pod is pivoted into helicopter mode, the curved cowl will substantially provide aerodynamic continuity between the bottom fairing, arranged towards the front of the pivoting front part of the pod in helicopter mode and the front of a bottom fairing of the rear stationary part of the pod. This will duly ensure a substantially geometric continuity of the bottom face of the two articulated parts of each pod both in aeroplane mode and in helicopter mode, which will promote aerodynamic continuity along this bottom face.

Further, to advantage, a swivel-mounted flap is mounted by a front edge so as to pivot about a pivot pin substantially parallel with the pivot axis on a rear portion of a top fairing of the pivoting front part of the pod in aeroplane mode so that this swivel-mounted flap will provide substantial geometric and hence aerodynamic continuity on the pod between said rear portion of the top fairing of said pivoting front part and a front edge of a top fairing of the stationary rear part of the pod in aeroplane mode, whereas, when converting from aeroplane mode to helicopter mode, the swivel-mounted flap is displaced, at least at its rear edge, on said top fairing of said stationary rear part of the pod, against which top fairing this swivel-mounted flap is applied in helicopter mode. As a result, in aeroplane mode, this swivel-mounted flap closes off the free space between the rear edge of the top fairing of the pivoting front part of the pod and the front edge of the top fairing of the stationary rear part of the pod, whereas in helicopter mode, these two respective rear and front edges of the top fairings of the respective pivoting front and stationary rear parts of the pod may be substantially contiguous, practically the entire surface of the swivel-mounted flap being applied against the top fairing of the stationary rear part of the pod, thereby producing geometric and hence aerodynamic continuity along the top face of the two pod parts, in aeroplane mode and helicopter mode alike, due to the pivoting action of this unique flap on the pivoting front part of the pod.

Advantageously, the swivel-mounted flap is retained against the top fairing of the stationary rear part of the pod due to the fact that the swivel-mounted flap is permanently elastically biassed and/or retained by at least one stop against said top fairing of said stationary rear part of the pod.

With regard to the curved cowl of the bottom fairing of the pivoting front part of the pod, this curved cowl may advantageously comprise at least one part which is in the shape of a cylinder portion, the axis of which coincides with the pivot axis, in particular a central part, and/or at least one part of a spherical shape centred on said pivot axis and in particular the lateral parts.

In order to simplify the design of the pivot pin enabling the front pod part and the corresponding rotor shaft as well as the front reduction gear unit of the corresponding transmission to pivot, in supporting the pivot pin on either side of said pivoting front part of the pod, and whilst avoiding an overhanging mounting yet retaining good aerodynamic continuity, at least in aeroplane mode, the pivoting front part of the pod advantageously pivots between two inner sides of two fixed front lateral extensions of said stationary rear part of the pod, each fixed front lateral extension being delimited at the front by a front face, preferably at least in part substantially curved and axisymmetric about the pivot axis and covered, in aeroplane mode, by a rear face, preferably of a substantially matching shape, on one respectively of two front lateral portions of said pivoting front part of the pod.

In one simple embodiment, the inner sides are flat sides, substantially perpendicular to the pivot axis and between which a central rear portion of said pivoting front part of the pod is pivotally mounted.

To guarantee a good supply of air to the engine, fixed in the stationary rear part of the pod, this stationary rear part has a fixed, bottom air inlet which opens at the front underneath said pivoting front part of the pod and which is advantageously dimensioned for aeroplane mode and, so that this air inlet is not masked in helicopter mode and in stationary flight, this fixed bottom air inlet opens towards the front at a front edge arranged in front of the pivot axis.

Another advantageous feature is that in helicopter mode, said pivoting front part of the pod frees at lease one lateral opening forming an air inlet, preferably an additional one, in said stationary rear part of the pod, which will improve the supply of air to the engine, for example, which operates at a higher speed in this flight configuration, or alternatively which will cool an oil radiator of the front reduction gear unit, which is subjected to higher stress in this flight configuration.

The actual architecture of the pod proposed by the invention allows pivoting of the corresponding rotor to be controlled by means of one or two parallel linear actuators, which can advantageously be fully integrated in each pod. In effect, the pivoting action of the pivoting front part of the pod relative to the corresponding stationary rear part can be controlled by at least one linear actuator fully integrated in the pod and swivel-mounted at one end on the internal structure of said stationary rear part and at its other end in said pivoting front part.

Figure 4A:
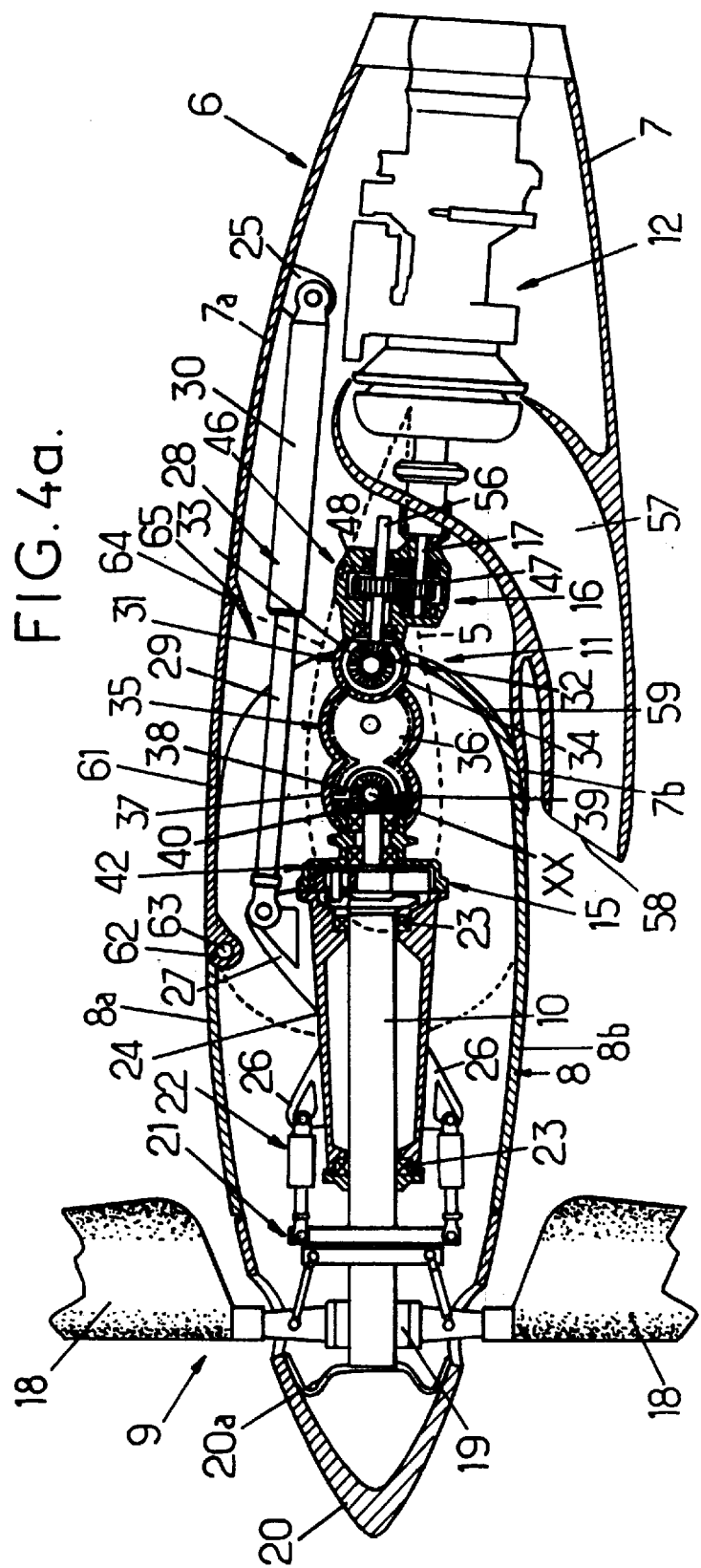
Figure 4B:
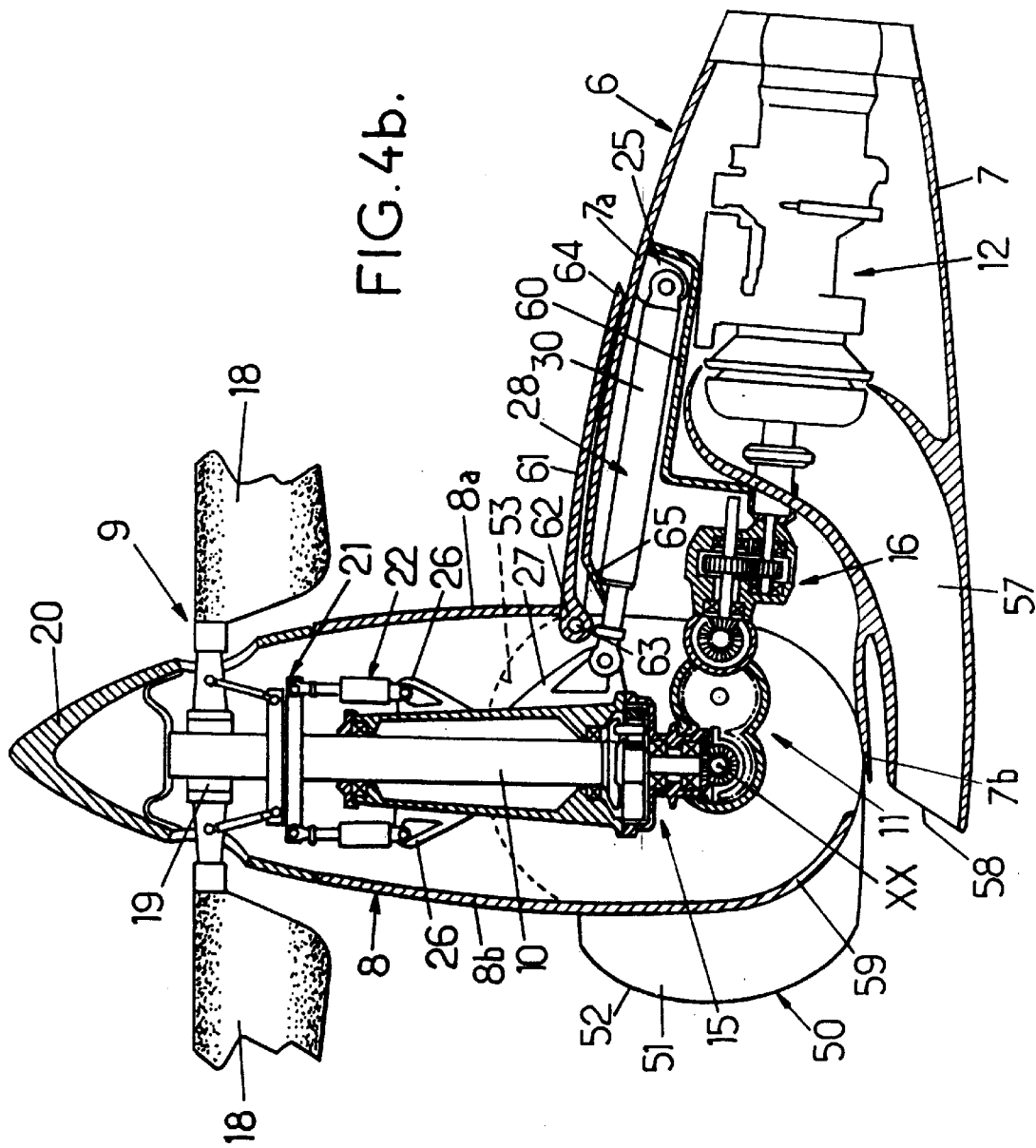
Figure 4C:
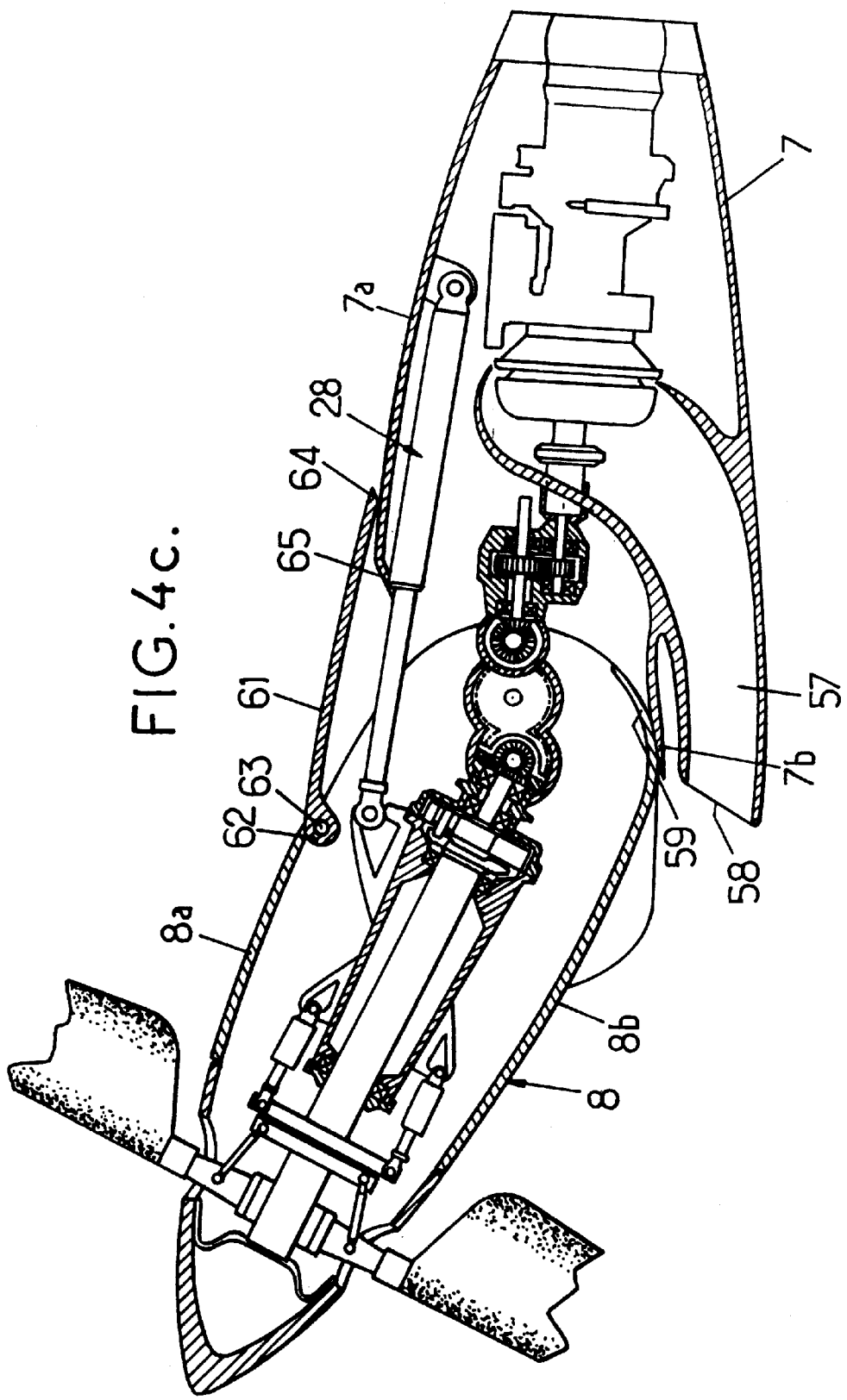

Other features and advantages of the invention will become clear from the description of examples below, given by way of illustration and not restrictive in any respect, with reference to the appended drawings, in which:

FIGS. 1 and 2 are schematic views in perspective of the convertible aircraft in aeroplane mode and helicopter mode respectively, FIG. 3 is a partial schematic plan view of the aircraft illustrated in FIGS. 1 and 2, FIGS. 4a and 4b are schematic views in partial longitudinal section and in partial side elevation of one of the two pods mounted on the wings of the aircraft illustrated in FIGS. 1 to 3 and housing an engine and a transmission linking this engine to a pivoting rotor of the aircraft, in aeroplane mode and helicopter mode respectively, FIG. 4c is a schematic view similar to those of FIGS. 4a and 4b and representing the pivot-mounted pod in the conversion process, illustrated in a position mid-way between the positions of aeroplane and helicopter modes as illustrated in FIGS. 4a and 4b respectively, FIG. 5 is a partial schematic view in perspective of a swivel-mounted pod in helicopter mode and.

FIGS. 6 and 7 are schematic views in perspective of a variant of a pod in aeroplane mode and in the process of converting between aeroplane and helicopter modes respectively.

The convertible aircraft 1 illustrated in FIGS. 1 to 3 comprises a fuselage 2, being of the aeroplane type, with a cockpit 3 at the front and a 'T'-shaped tail 4 at the rear, and two fixed, top-mounted wings 5 with a zero sweep and constant chord extending laterally in a conventional manner on each side of the fuselage 2, each fixed wing 5 supporting, substantially at the wing tip, a swivel-mounted pod 6, fixed to the corresponding wing 5 by its rear part 7.

Each pod 6, also illustrated in FIG. 5, comprises an aerodynamically streamlined front part 8, substantially of a nose cone design, and mounted so as to pivot relative to the stationary rear part 7 of the pod 6, and hence relative to the corresponding wing 5, about a pivot axis X—X which is transverse to the fuselage 2 and more specifically perpendicular to the longitudinal axis of symmetry A—A of the aircraft 1.

In this aerodynamic configuration of the aircraft, the pivot axis X—X is parallel with the straight line Y—Y passing through the aerodynamic centres of the wings 5 and slightly to the rear of this line Y—Y, located at a distance from the leading edge of the wings 5 which is approximately 25% of the value of the chord of the wings 5 in a direction to the trailing edge of these wings 5 (see FIG. 3).

In the pivoting front part 8 of each pod 6, a rotor 9 is mounted so as to rotate about the axis of its shaft 10 and simultaneously can pivot about the axis X—X with the front part 8 of the corresponding pod, the shaft 10 of each rotor 9 being linked, in order to be driven in rotation, via a transmission 11 to a turbo-engine unit 12 fixed in the stationary rear part 7 of the corresponding pod 6, in a layout that will be described in more detail below with reference to FIGS. 4a and 4b.

The convertible aircraft 1 is therefore fitted with two pivoting rotors 9, each of which can be pivoted between a helicopter configuration, in which each rotor is driven about a substantially vertical axis of rotation (the axis of its shaft 10), the shaft 10 being erected above the corresponding wing 5 so that the aircraft can operate in helicopter mode, and an aeroplane configuration in which each rotor 9 constitutes a propeller driven in rotation about a substantially horizontal axis aligned with the direction of flight in aeroplane mode, the pivoting front part 8 of each pod 6 thereby exhibiting an angle of incidence of virtually zero relative to the corresponding wing 5, so that the aircraft can operate in aeroplane mode.

For reasons of safety, so that the two rotors 9 can still be driven if either of the turbo-engine units 12 fails and regardless of the inclination of the shaft 10 of the rotors 9 about the pivot axis X—X, the to transmissions 11 are linked one to the other by means of an interconnecting shaft 13, which may be in a single piece or in two substantially rectilinear pieces, extending between the two pods 6 across the entire span of the fixed wings 5 and substantially parallel with the pivot axis X—X but offset relative to this axis X—X, for example towards the front of the wings 5 (see FIG. 3), the inter-connecting shaft 13 being coupled with an accessory drive casing 14 on the top of the fuselage 2.

So that each rotor 9 pivoting with the pivoting front part 8 of the corresponding pod 6 can be driven in rotation about the axis of its shaft 10 by the turbo-engine unit 12, housed in the stationary rear part 7 of its pod 6, or by the inter-connecting shaft 13 driven from the other turbo-engine unit 12 housed in the pod 6 of the other wing 5, each transmission 11 has a front reduction gear unit 15, provided as a main helicopter gearbox, which drives the shaft 10 of the rotor 9 and is mounted so as to pivot therewith about the pivot axis X—X aside the pivoting front part 8 of the pod 6, the main gearbox 15 remaining permanently meshed with a rear, non-pivoting reduction gear unit 16, permanently meshing with a power takeoff at the corresponding end of the inter-connecting shaft 13 and with an output shaft 17 of the corresponding turbo-engine unit 12. The rear, non-pivoting reduction gear unit 16 is arranged in an intermediate gearbox occupying a fixed position relative to the turbo-engine unit 12, the rear part 7 of the corresponding pod 6, the interconnecting shaft 13 and hence the wings 5 and is partly housed in the stationary rear part 7 of the pod 6 and in at least one of the aerodynamically shaped connectors 55 (see FIG. 3) or a linking fillet between the stationary rear part 7 of the pod and the corresponding wing 5.

In FIGS. 4a and 4b, the blades 18 of each rotor 9 are retained by their root on a hub 19 which is joined to one end of the shaft 10 of the rotor 9 in rotation, inside a dome 20 retained on this end of the shaft 10 by means of a flange 20a and driven in rotation therewith, and having orifices crossed through by the roots of the blades 18 articulated about a pitch axis in a conventional way for a helicopter rotor, the pitch thereof being controlled by servo-controls having a swash plate device 21 of a conventional structure and control-driven actuators 22, which are housed in the pivoting front part 8 of the pod and underneath the dome 20, shaped to close off the open front end of the pivoting part 8 of the pod in a continuous aerodynamic design. The shaft 10 is mounted so as to rotate with the aid of bearings 23 in a housing 24 disposed in the pivoting front part 8 of the pod and fixed to this part 8 and mounted so as to pivot with it about the pivot axis X—X by means of a pivot pin (not illustrated), and the shaft 10 is driven in rotation inside the housing 24 by means of the main gearbox 15 housed in the base of this housing 24. On the side of the hub 19, the housing 24 has three feet 26 providing an articulated link for the three pilot-control actuators 22, also articulated on the non-rotating plate of the swash plate device 21, the rotating plate of which is linked by means of pitch change rods to blade pitch levers 18, in a manner conventionally used for helicopter rotors. Towards its base, the housing 24 has one or two anchoring feet 27, on which or on each of which the end of the rod 29 of an actuator 28 or respectively one of two pivot actuators 28 of the rotor 9 is mounted in an articulated link, the or each actuator 28 possibly being provided in the form of a hydraulic or electric jack, the cylinder 30 of which is articulated on a fixed structural attachment 25 inside the top cowling 7a, on the internal structure of the stationary rear part 7 of the pod.

Accordingly, the rotors 9 are pivoted from the position assumed in aeroplane mode, in which the shaft 10 of each rotor extends towards the front of the corresponding fixed wing 5, at an angle of incidence that is substantially zero relative to this wing 5 (see FIGS. 1 and 4a), to the position assumed in helicopter mode, in which the shaft 10 of each rotor 9 is arranged substantially vertically above the corresponding fixed wing 5 (see FIGS. 4b and 5), by means of, for each rotor 9, a pivot actuator 28 or two parallel actuators 28, fully integrated in the corresponding pod 6.

The main gearbox 15, pivoting with the front part 8 of the pod, and the intermediate gearbox 16, fixed relative to the stationary rear part 7 of the pod, of the transmission 11 illustrated in FIGS. 4a and 4b are described in sufficient detail below to provide an understanding of how the transmission 11 operates. The output shaft 17 of the turbo-engine unit 12 is joined in coaxial rotation to one 47 of to cylindrical gears having straight or helical teeth 47 and 48 meshing with one another and constituting an input reduction gear stage, the other cylindrical gear 48 of which is joined in coaxial rotation with a conical input gear 32 of a conical ring frame 31 of a high speed reduction gear stage, re-centring the turbo-engine unit 12 and producing a reduction in the rotation speed, the conical output gear 33 thereof being joined in coaxial rotation about an axis perpendicular to that of the output shaft 17, with a cylindrical gear 34. This cylindrical gear 34 is a gear of an intermediate reduction gear stage 35, also belonging to the intermediate gearbox 16 and which has another intermediate cylindrical gear 36 meshing with the cylindrical gear 34 and with another cylindrical gear 37 towards the front of the corresponding wing 5, the aerodynamic contour of which is illustrated in broken lines on FIG. 4a.

This cylindrical gear 37 is a pivot gear, mounted (about a pivot pin not illustrated) so as to rotate coaxially about the pivot axis X—X. The pivot gear 37 is in turn joined in coaxial rotation, about the pivot axis X—X, to a conical input gear 38 of a conical ring frame 39 constituting the input reduction gear stage of the main gearbox 15, and the function of which is to transmit the rotary driving motion across the pivot axis X—X, adjusting the rotation speed. The conical output gear 40 of the input reduction gear stage 39 is in turn joined in coaxial rotation, about the axis of the shaft 10 of the rotor 9, to a planetary gear of an output reduction gear stage of the epicyclic type 42 of the main gearbox 15, this epicyclic stage 42 providing, in a known manner on main gearboxes of helicopters, a high reduction ratio in a minimum volume with the aid of satellites rolling inside an outer toothed annular gear and about the planetary gear, whilst a planet pinion cage is joined in rotation to the rotor shaft 10.

In order to provide a link with the inter-connecting shaft 13, the pivot gear 37 also meshes, towards the front of the wing 5, with another cylindrical gear (not illustrated in FIG. 4a) joined to the corresponding end of the inter-connecting shaft 13 and thus forming a power takeoff thus arranged on this shaft 13, as illustrated in FIG. 3, in front of the pivot axis X—X, although this arrangement is not restrictive. In effect, the interconnecting shaft 13 may be arranged, by choice, to the front or to the rear of the pivot axis X—X, provided the appropriate power takeoffs are provided at its ends to provide links to the rear non-pivoting reduction gear units or intermediate gearboxes 16 of the two transmissions 11.

In order to neutralise the differences between the rotation speeds of the shafts 17, a freewheel (not represented in the drawings) is incorporated in each transmission 11 and more specifically in each intermediate gearbox 16. For optimum function, this freewheel is advantageously disposed after the first reduction gear stage, and may be mounted between the gears 33 and 34 or as a variant between the gears 48 and 32.

In each transmission 11, an important function of the intermediate stage 35 is to keep sufficient space free between the high speed reduction gear stage 31 and the input stage 39 of the main gearbox 15 to guarantee that this main gearbox 15 will be able to pivot with the rotor 9 about the pivot axis X—X without interfering with the intermediate gearbox 16 and any other non-pivoting component which might be housed in the pod 6, for example equipments of the turbo-engine unit 12.

The pivot gear 37, the gears 36 and 34 of the intermediate reduction gear stage 35 as well as the gear (not illustrated) inter-connecting with the inter-connecting shaft 13 are gears, cylindrical gears in this example, which are laterally offset relative to the plane defined by the axis of the shaft 10 of the corresponding rotor 9 and by the axis of the output shaft 17 of the corresponding turbo-engine unit 12, these two axes being coplanar and perpendicular to the pivot axis X—X, so that these different gears, such as 37, 36 and 34, are outside the volume delimited between the two inner sides 51, facing one another, of two fixed, front lateral extensions 50, extending the stationary rear part 7 of the corresponding pod 6 laterally towards the front, and between which extensions 50 the pivoting front part 8 of the pod 6 is pivotally mounted by a rear central portion 8c (see FIGS. 1 to 3 and 5) of this pivoting front part 8.

In this example, the inner sides 51 of the extensions 50 are flat sides substantially perpendicular to the pivot axis X—X. Alternatively, however, it is possible for these sides 51 to be delimited at least partially by portions of spherical surfaces centred on the axis X—X or other surfaces of revolution or axisymmetric about the axis X—X.

Similarly, towards the front, each fixed extension 50 has a front face 52, the surface of which may be very small so that this front face 52 is substantially limited to a ridge if the corresponding inner side 51 is not flat but is cambered in a curvature about the pivot axis X—X so that it matches the external lateral face of the fixed extension 50. In the example illustrated in the drawings, since the inner sides 51 are flat, the front faces 52 are delimited by surface parts substantially curved or axisymmetric about the pivot axis X—X, for example by cylinder parts of axis X—X, the width (dimension along the axis X—X) thereof tapering towards the top and towards the bottom of the fixed extensions 50 in order to improve the aerodynamic contour of the pod 6 by rounding the frontal section of the fixed rear part 7.

In aeroplane mode, the front faces 52, cambered towards the front on the fixed extensions 50, are each covered respectively by one of the rear faces 53, of a substantially complementary shape, and therefore concave facing the axis X—X on two front lateral portions 54 of the pivoting front part 8.

This structure of the pivoting front part 8, the side parts 54 of which are geometrically extended in aeroplane mode by the fixed extensions 50 of the stationary rear part 7 of each pod 6, gives the pods 6 a good aerodynamic profile in this aeroplane mode, with a progressive change in the shapes in cross-section between the substantially conical dome 20 and the pivoting front 8 and stationary rear parts 7, the cross-sections of which are substantially very rounded.

So as not to load the tip of the wing 5, the pivot gear and gears of the intermediate stage and the inter-connecting stage, such as the above-mentioned gears 37, 36 and 34, are laterally offset outside the volume delimited between the two inner sides 51 of the fixed extensions 50 and on the side of the fuselage 2 and these gears are housed, either wholly or partially, in the fixed lateral extension 50 on the side of the fuselage 2 or alternatively in a stationary profiled connector 55 (see FIG. 3) of the wing fillet type, providing the connection between the wing 5 and the stationary rear part 7 of the pod and its extensions 50.

Each pod 6 therefore encases a pivoting unit comprising the corresponding main gearbox 15, the shaft 10 of the corresponding rotor 9 as well as its associated control means 21, 22, and the rod 29 of the pivot actuator or actuators 28, this pivoting unit being housed in the pivoting front part 8 of the pod 6, which pivoting front part 8 is pivotally mounted with the housing 24 between the two fixed lateral front extensions 50 of the stationary rear part 7 of the pod 6. The fixed structure (the stationary part 7 and its extensions 50 of the pod 6) incorporating the turbo-engine unit 12 is therefore used to encase the pivoting front part 8 laterally and, so as to avoid an overhanging mounting, the pivot pin (not illustrated) is advantageously supported on either side of this pivoting front part 8 by means of two pivot bearings (not illustrated), each housed in one respectively of the two fixed front lateral extensions 50 of the pod 6, so as to support the pivot pin on each wing 5 on either side of the corresponding pivoting unit outside the volume delimited between the two inner sides 51, thereby limiting strain on the pivot bearings. The conical input gear 38 of the input stage 39 of the main gearbox 15 as well as the pivot gear 37 are therefore on the same axis as the pivot pin.

Accessories arranged in the stationary rear part 7 of the pod 6, for example electrical equipment, in particular associated with the turbo-engine unit 12, may be driven by the high speed reduction gear stage 31, on which an output 56 (see FIG. 4a) is provided (with a rotation speed of approximately 12,000 revolutions per minute, for example), this output 56 being an extension of the shaft joining the cylindrical gear 48 of the input reduction gear stage 46 to the conical input gear 32 of the high speed reduction gear stage 31 in coaxial rotation.

Underneath the high speed reduction gear stage 31 of the transmission 11, the stationary rear part 7 of each pod 6 also has an air inlet 57 for supplying air to the turbo-engine unit 12, the fixed position of which in the stationary rear part 7 significantly simplifies fitting and maintenance not only of the turbo-engine unit 12, but also the fuel, hydraulic, electrical, ... circuits associated therewith and the structure retaining them.

Taking account of the position of the fixed air inlet 57 which projects out from underneath the pod 6, as well as the dimensions it requires in order to supply the turbo-engine unit 12 in aeroplane mode and in order to avoid any problems with air supply in helicopter mode and in stationary flight, the passage of the air inlet 57 extends towards the front, underneath the pivoting front part 8, underneath which the air inlet 57 opens towards the front by means of a front edge 58 arranged in front of the pivot axis X—X and the vertical plane passing through this axis. This geometry enables fresh air to be sucked in through the air inlet 57 in stationary flight.

When the pivoting front part 8 is pivoting from aeroplane mode to helicopter mode and when it is in this helicopter mode, the aerodynamic continuity at the lower part of each pod 6 and in particular immediately in front of the front edge 58 of the fixed bottom air inlet 57 is provided by means of a curved cowl 59 having the shape of a portion of a cylindrical surface, the axis of which coincides with the pivot axis X—X and the concave aspect being is turned towards this axis X—X, this curved cowl 59 forming a single unit with a bottom cowling 8b (in aeroplane mode) of the pivoting front part 8 of the pod and extending the rear edge of this bottom cowling 8b towards the rear and towards the interior of the stationary rear part 7 of the pod 6 in aeroplane mode (see FIG. 4a). Accordingly, when converting from aeroplane mode to helicopter mode and in this latter mode, the curved cowl 59 is gradually moved out from the pod 6 by the pivoting action of the front part 8, the bottom cowling 8b of which becomes a front cowling and does so in such a way that the curved cowl 59 ensures the geometric and hence aerodynamic continuity between this bottom or front cowling 8b of the pivoting front part 8 and the front edge of a bottom cowling 7b of the stationary rear part 7 above the bottom air inlet 57 (see FIGS. 4c and 4b). Generally speaking, the curved cowl 59 is axisymmetrically curved about the pivot axis X—X. In particular, at least at its central part (towards the centre of the pod 6 parallel with the axis X—X), this cowl 59 has a part having the shape of a cylinder portion, the axis of which coincides with the pivot axis X—X whilst at each of its two lateral parts, the curved cowl 59 may have a part shaped in the form of a portion of a sphere centred on the axis X—X and adjacent to one respectively of the sides 51. The curved cowl 59 of the bottom cowling 8b of the pivoting front part 8 of the pod 6 therefore substantially links the rear edge of this bottom cowling 8b to the front edge of the bottom cowling 7b of the stationary rear part 7 of this same pod 6.

In aeroplane mode, the curved cowl 59 partially doubles an anti-fire screen, shown schematically by reference 60 in FIG. 4b, which extends across the stationary rear part 7 of the pod 6, in front of the turbo-engine unit 12 and immediately behind the first reduction gear stages of the intermediate gearbox 16, this screen 60 also extending between the turbo-engine unit 12 and the actuator or actuators 28 and joining the top cowling 7a at the rear of this or these latter. The turbo-engine unit 12 may thus be insulated by a simple anti-fire screen 60.

In helicopter mode, the curved cowl 59 also protects the transmission 11 and in particular the main gearbox 15 as well as the reduction gear stages 31 and 46 of the intermediate gearbox 16 from any foreign bodies which might otherwise penetrate from the front.

In aeroplane mode (FIG. 4a), at the upper part of each pod 6, the aerodynamic continuity between the rear edge of the top cowling 8a of the pivoting front part 8 and the front edge of the top cowling 7a of the stationary rear part 7 is provided by means of a swivel-mounted flap 61, of a substantially rectangular shape and slightly cambered in a transverse direction and in a longitudinal direction, this flap 61 being mounted by its front edge 62 so as to pivot about a pivot pin 63 substantially parallel with the pivot axis X—X, on the rear edge or a rear portion of the top cowling 8a and so that the rear edge 64 of the flap 61 rests substantially on the front of a spoiler 65 projecting towards the front and into the interior of the pod 6 on the front edge of the top cowling 7a of the stationary rear part 7.

During transition from aeroplane mode to helicopter mode, i.e. whilst the front part 8 is pivoting about the pivot axis X—X, the flap 61 pivots about the pin 63 relative to the pivoting front part 8, the pin 63 being simultaneously displaced towards the rear with the top cowling 8a across a circular arc centred on the axis X—X and such that the rear edge 64 of the flap 61 is displaced on the top cowling 7a of the stationary rear part 7. FIG. 4c illustrates the respective positions of the flap 61 and its front 62 and rear 64 edges relative to the top cowlings 8a and 7a of the pivoting front part 8 and the stationary rear 7 parts respectively during transition and in an intermediate position between the positions of aeroplane mode and helicopter mode. In this latter position (FIG. 4b), the pivot pin 63 and the rear (now bottom) edge of the top (now rear) cowling 8a of the pivoting front part 8 is close to the spoiler 65 at the front of the top cowling 7a of the stationary rear part 7 and the greater part of the flap 61 rests on this top cowling 7a against which the flap 61 is applied, for example by elastic biassing means such as a torsion spring mounted around the pivot pin 63, and one end of which abuts in a known manner against a support fixed on the top cowling 8a whilst the other end is anchored in the flap 61 so as to elastically bias this latter towards the top cowling 7a. Other means could also be used to hold the flap 61 in contact against the top cowling 7a, at least by its rear edge 64, for example a finger joined to the rear edge 64 of the flap 61 and projecting towards the interior of the top cowling 7a across a longitudinal slide opening arranged in this top cowling 7a, this finger supporting a stop inside the cowling 7a which prevents the finger from disengaging out of the slide opening.

Another function of this swivel-mounted flap 61 is to protect the actuator or actuators 28 and the transmission 11 in aeroplane mode from ingress by any foreign bodies which might get into the pod 6 from the top.

Accordingly, on each articulated pod 6, the two elements comprising the curved cowl 59 and the swivel-mounted flap 61 ensure the aerodynamic continuity of the pod 6 regardless of the flight configuration and in particular in aeroplane mode when the highest speeds are reached, avoiding any marked surface discontinuity or any major orifice in the external shape of the pod 6 with the assistance of these two mobile parts to close off these surface discontinuities or orifices. The top and bottom faces of each pod 6 are substantially continuous in helicopter mode and in aeroplane mode and the pod 6 exhibits nothing which disrupts its shape.

The variant of a pod 6' illustrated in FIGS. 6 and 7 essentially differs from that of the previous drawings in that it has an additional air inlet 66, which opens towards the front, laterally above the fixed main air inlet 57 provided in the lover part of the stationary rear part 7' of the pod 6'. More specifically, the extra air inlet 66 opens into an external lateral part of a fixed front lateral extension 50' of the stationary rear part 7' and does so such that this additional air inlet 66 is closed off by a part of the rear face of a lateral portion 54', on the corresponding side, of the pivoting front part 8' of the pod 6' in aeroplane mode.

In another variant, a second additional air inlet such as 66 may be arranged in the external lateral part of the other fixed front lateral extension 50' of the stationary rear part 7', this second additional air inlet also being closed off in aeroplane mode by a part of the rear face of the other lateral portion 54' of the pivoting front part 8'. The additional air inlet or inlets such as 66 is or are uncovered as the pivoting front part 8' is pivoted, by at least one actuator 28, from the position in aeroplane mode (FIG. 6) to the position in helicopter mode and, as illustrated in FIG. 7, during this changeover.

For the rest, there is a swivel-mounted flap 61 pivoting by its front edge on the rear edge of the top cowing 8a of the pivoting front part 8', the rear edge 64 of which slides on the top cowling 7a of the stationary rear part 7' during the changeover from aeroplane mode to helicopter mode. Although not visible in FIGS. 6 and 7, a curved cowl such as 59 illustrated in FIGS. 4a and 4b is also provided in a single piece in the extension of the bottom cowling of the front part 8', as described with reference to the preceding drawings.

In the variant illustrated in FIGS. 6 and 7, in order to reduce any masking of the air inlet 57 during stationary flight, the main bottom air inlet 57, the front edge 58 of which is also shifted forward in front of the vertical plane passing through the pivot axis of the pivoting front part 8' on the stationary rear part 7', is, as above, designed to supply air to the turbo-engine unit in the stationary rear part 7', whilst the additional lateral air vent 66 is designed to admit fresh air, for example, to cool an oil radiator (not illustrated) associated with the corresponding gearbox.

The shape of the pod 6' illustrated in FIGS. 6 and 7 limits any play or lack of streamlining throughout all phases of the pivoting action. In aeroplane mode, excellent aerodynamic continuity is guaranteed due to the swivel-mounted flap 61 and the fact that the additional lateral air inlet or inlets 66 is or are covered over by a or the side portions 54' of the pivoting front part 8', the top 8a, bottom and side cowlings of which are directly extended by the top 7a, bottom and side cowlings of the stationary rear part 7'. Between the dome 20, which is substantially conical in shape, of the corresponding rotor at the front end of the pivoting front part 8' and the nozzle 67, which is of a substantially truncated cone shape, for the discharge of combustion gases from the corresponding turbo-engine unit, the pivoting front 8' and stationary rear 7' parts gradually change in cross-section, respectively from a substantially truncated cone shape to a rectangular cross-section with cambered and convex sides towards the exterior in the case of the pivoting front part 8', then from a substantially rectangular shape with cambered and convex sides towards the exterior to a substantially truncated cone shape in the case of the stationary rear part 7', as illustrated in FIG. 6. This change in frontal section of the pods 6' enables aerodynamic drag to be reduced.

What is claimed is:

1. A convertible aircraft with tilting rotors which is capable of operating in aeroplane mode and in helicopter mode, and comprising at least one fuselage, a fixed wing system comprising at least two wings extending laterally on either side of said fuselage and, in helicopter mode, a rotating wing system comprising at least two rotors, each having a substantially vertical shaft erected above a respective fixed wing and mounted so that said shaft can pivot on said fixed wing about a pivot axis arranged transversely to the fuselage, said shaft pivoting towards the front of said fixed wing in order to switch from helicopter mode to aeroplane mode, in which the rotors act as propellers, the shaft of each rotor being driven in rotation about itself by a front reduction gear unit of one respectively of two transmissions, each also having a rear reduction gear unit linked to the corresponding front reduction gear unit as well as one respectively of two engines, each supported respectively on one of the two fixed wings, and to an interconnecting shaft linking the two transmissions so that the two rotors can be driven in rotation by either of the two engines in the event that the other engine fails, the shaft of each rotor, the corresponding transmission and the corresponding engine being housed in one respectively of two articulated pods, each comprising a front part which pivots about the pivot axis on a stationary rear part fixed to one respectively of the two fixed wings and in which the corresponding engine and at least a part of the rear reduction gear unit of the corresponding transmission are housed, the front reduction gear unit of said transmission and shaft of the corresponding rotor being housed in a pivoting front part of the pod and being mounted so as to pivot with said front part relative to said rear part and said corresponding wing, wherein said pivoting front part of the pod has a bottom fairing in aeroplane mode, which is extended towards the rear and towards the interior of the stationary rear part of the pod by means of a curved cowl, the concave aspect of which is turned towards the pivot axis and at least partially and axisymmetrically curved about said pivot axis, so that when said pivoting front part of the pod is pivoted into helicopter mode, the curved cowl will substantially provide aerodynamic continuity between said bottom fairing, arranged towards the front of the pivoting front part of the pod in helicopter mode and the front of a bottom fairing of said stationary rear part of the pod, wherein a swivel-mounted flap is mounted by a front edge so as to pivot about a pivot pin substantially parallel with said pivot axis on a rear portion of a top fairing of the pivoting front part of the pod in aeroplane mode so that said swivel-mounted flap will provide substantial aerodynamic continuity on the pod between said rear portion of the top fairing of said pivoting front part and a front edge of a top fairing of said stationary rear part of the pod in aeroplane mode, whereas when converting from aeroplane mode to helicopter mode, said swivel-mounted flap is displaced, at least at its rear edge, on said top fairing of said stationary rear part of the pod, against which top fairing said swivel-mounted flap is applied in helicopter mode.

2. A convertible aircraft as claimed in claim 1, wherein said swivel-mounted flap is permanently elastically biassed and/or retained against said top fairing of said stationary rear part of the pod by at least one stop.

3. A convertible aircraft as claimed in claim 1, wherein said curved cowl comprises at least one part having the shape of a spherical portion centered on said pivot axis.

4. A convertible aircraft as claimed in claim 1, wherein said curved cowl comprises at least one part which is in the shape of a cylinder portion, the axis of which coincides with the pivot axis.

5. A convertible aircraft as claimed in claim 1, wherein said pivoting front part of the pod pivots between two inner sides of two fixed front lateral extensions of said stationary rear part of the pod, each fixed front lateral extension being delimited at the front by a front face, at least in part substantially curved and axisymmetric about the pivot axis and covered, in aeroplane mode, by a rear face of a substantially matching shape, on one respectively of two front lateral portions of said pivoting front part of the pod.

6. A convertible aircraft as claimed in claim 5, wherein said inner sides are flat sides, substantially perpendicular to the pivot axis and between which a central rear portion of said pivoting front part of the pod is pivotally mounted.

7. A convertible aircraft as claimed in claim 1, wherein said stationary rear part of the pod has a fixed, bottom air inlet which opens at the front underneath said pivoting front part at a front edge arranged in front of said pivot axis.

8. A convertible aircraft as claimed in claim 1, wherein, in helicopter mode, said pivoting front part of the pod frees at least one lateral opening forming an air inlet in said stationary rear part of the pod.

9. A convertible aircraft as claimed in claim 1, wherein the pivoting action of said pivoting front part of the pod relative to said stationary rear part is controlled by at least one linear actuator fully integrated in the pod and swivel-mounted at one end on an internal structure underneath the top fairing of said stationary rear part and at its other end in said pivoting front part.

10. A convertible aircraft with tilting rotors which is capable of operating in aeroplane mode and in helicopter mode, and comprising at least one fuselage, a fixed wing system comprising at least two wings extending laterally on either side of said fuselage and, in helicopter mode, a rotating wing system comprising at least two rotors, each having a substantially vertical shaft erected above a respective fixed wing and mounted so that said shaft can pivot on said fixed wing about a pivot axis arranged transversely to the fuselage, said shaft pivoting towards the front of said fixed wing in order to switch from helicopter mode to aeroplane mode, in which the rotors act as propellers, the shaft of each rotor being driven in rotation about itself by a front reduction gear unit of one respectively of two transmissions, each also having a rear reduction gear unit linked to the corresponding front reduction gear unit as well as one respectively of two engines, each supported respectively on one of the two fixed wings, and to an interconnecting shaft linking the two transmissions so that the two rotors can be driven in rotation by either of the two engines in the event that the other engine fails, the shaft of each rotor, the corresponding transmission and the corresponding engine being housed in one respectively of two articulated pods, each comprising a front part which pivots about the pivot axis on a stationary rear part fixed to one respectively of the two fixed wings and in which the corresponding engine and at least a part of the rear reduction gear unit of the corresponding transmission are housed, the front reduction gear unit of said transmission and shaft of the corresponding rotor being housed in the pivoting front part of the pod and being mounted so as to pivot with said front part relative to said rear part and said corresponding wing, wherein said pivoting front part of the pod has a bottom fairing in aeroplane mode, which is extended towards the rear and towards the interior of the stationary rear part of the pod by means of a curved cowl, the concave aspect of which is turned towards the pivot axis and at least partially and axisymmetrically curved about said pivot axis, so that when said pivoting front part of the pod is pivoted into helicopter mode, the curved cowl will substantially provide aerodynamic continuity between said bottom fairing, arranged towards the front of the pivoting front part of the pod in helicopter mode and the front of a bottom fairing of said stationary rear part of the pod, wherein said curved cowl comprises at least one part having the shape of a spherical portion centered on said pivot axis.

11. A convertible aircraft as claimed in claim 10, wherein a swivel-mounted flap is mounted by a front edge so as to pivot about a pivot pin substantially parallel with said pivot axis on a rear portion of a top fairing of the pivoting front part of the pod in aeroplane mode so that said swivel-mounted flap will provide substantial aerodynamic continuity on the pod between said rear portion of the top fairing of said pivoting front part and a front edge of a top fairing of said stationary rear part of the pod in aeroplane mode, whereas when converting from aeroplane mode to helicopter mode, said swivel-mounted flap is displaced, at least at its rear edge, on said top fairing of said stationary rear part of the pod, against which top fairing said swivel-mounted flap is applied in helicopter mode.

12. A convertible aircraft as claimed in claim 11, wherein said swivel-mounted flap is permanently elastically biassed and/or retained against said top fairing of said stationary rear part of the pod by at least one stop.

13. A convertible aircraft as claimed in claim 10, wherein said curved cowl comprises at least one part which is in the shape of a cylinder portion, the axis of which coincides with the pivot axis.

14. A convertible aircraft as claimed in claim 10, wherein said pivoting front part of the pod pivots between two inner sides of two fixed front lateral extensions of said stationary rear part of the pod, each fixed front lateral extension being delimited at the front by a front face, at least in part substantially curved and axisymmetric about the pivot axis and covered, in aeroplane mode, by a rear face of a substantially matching shape, on one respectively of two front lateral portions of said pivoting front part of the pod.

15. A convertible aircraft as claimed in claim 14, wherein said inner sides are flat sides, substantially perpendicular to the pivot axis and between which a central rear portion of said pivoting front part of the pod is pivotally mounted.

16. A convertible aircraft as claimed in claim 10, wherein said stationary rear part of the pod has a fixed, bottom air inlet which opens at the front underneath said pivoting front part at a front edge arranged in front of said pivot axis.

17. A convertible aircraft as claimed in claim 10, wherein, in helicopter mode, said pivoting front part of the pod frees at least one lateral opening forming an air inlet in said stationary rear part of the pod.

18. A convertible aircraft as claimed in claim 11, wherein the pivoting action of said pivoting front part of the pod relative to said stationary rear part is controlled by at least one linear actuator fully integrated in the pod and swivel-mounted at one end on an internal structure underneath the top failing of said stationary rear part and at its other end in said pivoting front part.

19. A convertible aircraft with tilting rotors which is capable of operating in aeroplane mode and in helicopter mode, and comprising at least one fuselage, a fixed wing system comprising at least two wings extending laterally on either side of said fuselage and, in helicopter mode, a rotating wing system comprising at least two rotors, each having a substantially vertical shaft erected above a respective fixed wing and mounted so that said shaft can pivot on said fixed wing about a pivot axis arranged transversely to the fuselage, said shaft pivoting towards the front of said fixed wing in order to switch from helicopter mode to aeroplane mode, in which the rotors act as propellers, the shaft of each rotor being driven in rotation about itself by a front reduction gear unit of one respectively of two transmissions, each also having a rear reduction gear unit linked to the corresponding front reduction gear unit as well as one respectively of two engines, each supported respectively on one of the two fixed wings, and to an interconnecting shaft linking the two transmissions so that the two rotors can be driven in rotation by either of the two engines in the event that the other engine fails, the shaft of each rotor, the corresponding transmission and the corresponding engine being housed in one respectively of two articulated pods, each comprising a front part which pivots about the pivot axis on a stationary rear part fixed to one respectively of the two fixed wings and in which the corresponding engine and at least a part of the rear reduction gear unit of the corresponding transmission are housed, the front reduction gear unit of said transmission and shaft of the corresponding rotor being housed in the pivoting front part of the pod and being mounted so as to pivot with said front part relative to said rear part and said corresponding wing, wherein said pivoting front part of the pod has a bottom fairing in aeroplane mode, which is extended towards the rear and towards the interior of the stationary rear part of the pod by means of a curved cowl, the concave aspect of which is turned towards the pivot axis and at least partially and axisymmetrically curved about said pivot axis, so that when said pivoting front part of the pod is pivoted into helicopter mode, the curved cowl will substantially provide aerodynamic continuity between said bottom fairing, arranged towards the front of the pivoting front part of the pod in helicopter mode and the front of a bottom fairing of said stationary rear part of the pod, wherein said pivoting front part of the pod pivots between two inner sides of two fixed front lateral extensions of said stationary rear part of the pod, each fixed front lateral extension being delimited at the front by a front face, at least in part substantially curved and axisymmetric about the pivot axis and covered, in aeroplane mode, by a rear face of a substantially matching shape, on one respectively of two front lateral portions of said pivoting front part of the pod.

20. A convertible aircraft as claimed in claim 19, wherein a swivel-mounted flap is mounted by a front edge so as to pivot about a pivot pin substantially parallel with said pivot axis on a rear portion of a top fairing of the pivoting front part of the pod in aeroplane mode so that said swivel-mounted flap will provide substantial aerodynamic continuity on the pod between said rear portion of the top fairing of said pivoting front part and a front edge of a top fairing of said stationary rear part of the pod in aeroplane mode, whereas when converting from aeroplane mode to helicopter mode, said swivel-mounted flap is displaced, at least at its rear edge, on said top fairing of said stationary rear part of the pod, against which top fairing said swivel-mounted flap is applied in helicopter mode.

21. A convertible aircraft as claimed in claim 20, wherein said swivel-mounted flap is permanently elastically biassed and/or retained against said top fairing of said stationary rear part of the pod by at least one stop.

22. A convertible aircraft as claimed in claim 19, wherein said curved cowl comprises at least one part having the shape of a spherical portion centered on said pivot axis.

23. A convertible aircraft as claimed in claim 19, wherein said curved cowl comprises at least one part which is in the shape of a cylinder portion, the axis of which coincides with the pivot axis.

24. A convertible aircraft as claimed in claim 19, wherein said inner sides are flat sides, substantially perpendicular to the pivot axis and between which a central rear portion of said pivoting front part of the pod is pivotally mounted.

25. A convertible aircraft as claimed in claim 19, wherein said stationary rear part of the pod has a fixed, bottom air inlet which opens at the front underneath said pivoting front part at a front edge arranged in front of said pivot axis.

26. A convertible aircraft as claimed in claim 19, wherein, in helicopter mode, said pivoting front part of the pod frees at least one lateral opening forming an air inlet in said stationary rear part of the pod.

27. A convertible aircraft as claimed in claim 20, wherein the pivoting action of said pivoting front part of the pod relative to said stationary rear part is controlled by at least one linear actuator fully integrated in the pod and swivel-mounted at one end on an internal structure underneath the top fairing of said stationary rear part and at its other end in said pivoting front part.

28. A convertible aircraft with tilting rotors which is capable of operating in aeroplane mode and in helicopter mode, and comprising at least one fuselage, a fixed wing system comprising at least two wings extending laterally on either side of said fuselage and, in helicopter mode, a rotating wing system comprising at least two rotors, each having a substantially vertical shaft erected above a respective fixed wing and mounted so that said shaft can pivot on said fixed wing about a pivot axis arranged transversely to the fuselage, said shaft pivoting towards the front of said fixed wing in order to switch from helicopter mode to aeroplane mode, in which the rotors act as propellers, the shaft of each rotor being driven in rotation about itself by a front reduction gear unit of one respectively of two transmissions, each also having a rear reduction gear unit linked to the corresponding front reduction gear unit as well as one respectively of two engines, each supported respectively on one of the two fixed wings, and to an interconnecting shaft linking the two transmissions so that the two rotors can be driven in rotation by either of the two engines in the event that the other engine fails, the shaft of each rotor, the corresponding transmission and the corresponding engine being housed in one respectively of two articulated pods, each comprising a front part which pivots about the pivot axis on a stationary rear part fixed to one respectively of the two fixed wings and in which the corresponding engine and at least a part of the rear reduction gear unit of the corresponding transmission are housed, the front reduction gear unit of said transmission and shaft of the corresponding rotor being housed in the pivoting front part of the pod and being mounted so as to pivot with said front part relative to said rear part and said corresponding wing, wherein said pivoting front part of the pod has a bottom fairing in aeroplane mode, which is extended towards the rear and towards the interior of the stationary rear part of the pod by means of a curved cowl, the concave aspect of which is turned towards the pivot axis and at least partially and axisymmetrically curved about said pivot axis, so that when said pivoting front part of the pod is pivoted into helicopter mode, the curved cowl will substantially provide aerodynamic continuity between said bottom fairing, arranged towards the front of the pivoting front part of the pod in helicopter mode and the front of a bottom fairing of said stationary rear part of the pod, wherein said stationary rear part of the pod has a fixed, bottom air inlet which opens at the front underneath said pivoting front part at a front edge arranged in front of said pivot axis.

29. A convertible aircraft as claimed in claim 28, wherein a swivel-mounted flap is mounted by a front edge so as to pivot about a pivot pin substantially parallel with said pivot axis on a rear portion of a top fairing of the pivoting front part of the pod in aeroplane mode so that said swivel-mounted flap will provide substantial aerodynamic continuity on the pod between said rear portion of the top fairing of said pivoting front part and a front edge of a top fairing of said stationary rear part of the pod in aeroplane mode, whereas when converting from aeroplane mode to helicopter mode, said swivel-mounted flap is displaced, at least at its rear edge, on said top fairing of said stationary rear part of the pod, against which top fairing said swivel-mounted flap is applied in helicopter mode.

30. A convertible aircraft as claimed in claim 29, wherein said swivel-mounted flap is permanently elastically biassed and/or retained against said top fairing of said stationary rear part of the pod by at least one stop.

31. A convertible aircraft as claimed in claim 28, wherein said curved cowl comprises at least one part having the shape of a spherical portion centered on said pivot axis.

32. A convertible aircraft as claimed in claim 28, wherein said curved cowl comprises at least one part which is in the shape of a cylinder portion, the axis of which coincides with the pivot axis.

33. A convertible aircraft as claimed in claim 28, wherein said pivoting front part of the pod pivots between two inner sides of two fixed front lateral extensions of said stationary rear part of the pod, each fixed front lateral extension being delimited at the front by a front face, at least in part substantially curved and axisymmetric about the pivot axis and covered, in aeroplane mode, by a rear face of a substantially matching shape, on one respectively of two front lateral portions of said pivoting front part of the pod.

34. A convertible aircraft as claimed in claim 33, wherein said inner sides are flat sides, substantially perpendicular to the pivot axis and between which a central rear portion of said pivoting front part of the pod is pivotally mounted.

35. A convertible aircraft as claimed in claim 28, wherein, in helicopter mode, said pivoting front part of the pod frees at least one lateral opening forming an air inlet in said stationary rear part of the pod.

36. A convertible aircraft as claimed in claim 29, wherein the pivoting action of said pivoting front part of the pod relative to said stationary rear part is controlled by at least one linear actuator fully integrated in the pod and swivel-mounted at one end on an internal structure underneath the top fairing of said stationary rear part and at its other end in said pivoting front part.

37. A convertible aircraft with tilting rotors which is capable of operating in aeroplane mode and in helicopter mode, and comprising at least one fuselage, a fixed wing system comprising at least two wings extending laterally on either side of said fuselage and, in helicopter mode, a rotating wing system comprising at least two rotors, each having a substantially vertical shaft erected above a respective fixed wing and mounted so that said shaft can pivot on said fixed wing about a pivot axis arranged transversely to the fuselage, said shaft pivoting towards the front of said fixed wing in order to switch from helicopter mode to aeroplane mode, in which the rotors act as propellers, the shaft of each rotor being driven in rotation about itself by a front reduction gear unit of one respectively of two transmissions, each also having a rear reduction gear unit linked to the corresponding front reduction gear unit as well as one respectively of two engines, each supported respectively on one of the two fixed wings, and to an interconnecting shaft linking the two transmissions so that the two rotors can be driven in rotation by either of the two engines in the event that the other engine fails, the shaft of each rotor, the corresponding transmission and the corresponding engine being housed in one respectively of two articulated pods, each comprising a front part which pivots about the pivot axis on a stationary rear part fixed to one respectively of the two fixed wings and in which the corresponding engine and at least a part of the rear reduction gear unit of the corresponding transmission are housed, the front reduction gear unit of said transmission and shaft of the corresponding rotor being housed in the pivoting front part of the pod and being mounted so as to pivot with said front part relative to said rear part and said corresponding wing, wherein said pivoting front part of the pod has a bottom fairing in aeroplane mode, which is extended towards the rear and towards the interior of the stationary rear part of the pod by means of a curved cowl, the concave aspect of which is turned towards the pivot axis and at least partially and axisymmetrically curved about said pivot axis, so that when said pivoting front part of the pod is pivoted into helicopter mode, the curved cowl will substantially provide aerodynamic continuity between said bottom fairing, arranged towards the front of the pivoting front part of the pod in helicopter mode and the front of a bottom fairing of said stationary rear part of the pod, wherein, in helicopter mode, said pivoting front part of the pod frees at least one lateral opening forming an air inlet in said stationary rear part of the pod.

38. A convertible aircraft as claimed in claim 37, wherein a swivel-mounted flap is mounted by a front edge so as to pivot about a pivot pin substantially parallel with said pivot axis on a rear portion of a top fairing of the pivoting front part of the pod in aeroplane mode so that said swivel-mounted flap will provide substantial aerodynamic continuity on the pod between said rear portion of the top fairing of said pivoting front part and a front edge of a top fairing of said stationary rear part of the pod in aeroplane mode, whereas when converting from aeroplane mode to helicopter mode, said swivel-mounted flap is displaced, at least at its rear edge, on said top fairing of said stationary rear part of the pod, against which top fairing said swivel-mounted flap is applied in helicopter mode.

39. A convertible aircraft as claimed in claim 38, wherein said swivel-mounted flap is permanently elastically biassed and/or retained against said top fairing of said stationary rear part of the pod by at least one stop.

40. A convertible aircraft as claimed in claim 37, wherein said curved cowl comprises at least one part having the shape of a spherical portion centered on said pivot axis.

41. A convertible aircraft as claimed in claim 37, wherein said curved cowl comprises at least one part which is in the shape of a cylinder portion, the axis of which coincides with the pivot axis.

42. A convertible aircraft as claimed in claim 37, wherein said pivoting front part of the pod pivots between two inner sides of two fixed front lateral extensions of said stationary rear part of the pod, each fixed front lateral extension being delimited at the front by a front face, at least in part substantially curved and axisymmetric about the pivot axis and covered, in aeroplane mode, by a rear face of a substantially matching shape, on one respectively of two front lateral portions of said pivoting front part of the pod.

43. A convertible aircraft as claimed in claim 42, wherein said inner sides are flat sides, substantially perpendicular to the pivot axis and between which a central rear portion of said pivoting front part of the pod is pivotally mounted.

44. A convertible aircraft as claimed in claim 37, wherein said stationary rear part of the pod has a fixed, bottom air inlet which opens at the front underneath said pivoting front part at a front edge arranged in front of said pivot axis.

45. A convertible aircraft as claimed in claim 38, wherein the pivoting action of said pivoting front part of the pod relative to said stationary rear part is controlled by at least one linear actuator fully integrated in the pod and swivel-mounted at one end on an internal structure underneath the top fairing of said stationary rear part and at its other end in said pivoting front part.

\* \* \* \* \*